W. L. NIEMANN.
POULTRY COOP.
APPLICATION FILED OCT. 17, 1910.

1,090,224.

Patented Mar. 17, 1914.

Attest:
H. G. Fletcher
M. C. Hammon

Inventor:
William L. Niemann
By Knight Bros.
attys.

UNITED STATES PATENT OFFICE.

WILLIAM L. NIEMANN, OF MOUNT OLIVE, ILLINOIS.

POULTRY-COOP.

1,090,224.   Specification of Letters Patent.   Patented Mar. 17, 1914.

Original application filed October 14, 1909, Serial No. 522,505. Divided and this application filed October 17, 1910. Serial No. 587,368.

*To all whom it may concern:*

Be it known that I, WILLIAM L. NIEMANN, a citizen of the United States, residing at Mount Olive, county of Macoupin, and State of Illinois, have invented certain new and useful Improvements in Poultry-Coops, of which the following is a specification.

My invention relates to poultry coops, and has for its objects the production of a coop of this character which is especially adapted for poultry brooding purposes, and which may be used for half grown chickens as well as smaller chicks and in fact for chickens of any size.

My invention relates especially to the bottom arrangement of the coop, and constitutes a division of my application filed October 14, 1909, Serial No. 522,505, entitled Brood coops. The bottom of the coop is such that the same may be easily removed and cleansed in the manner hereinafter described.

Figure 1:
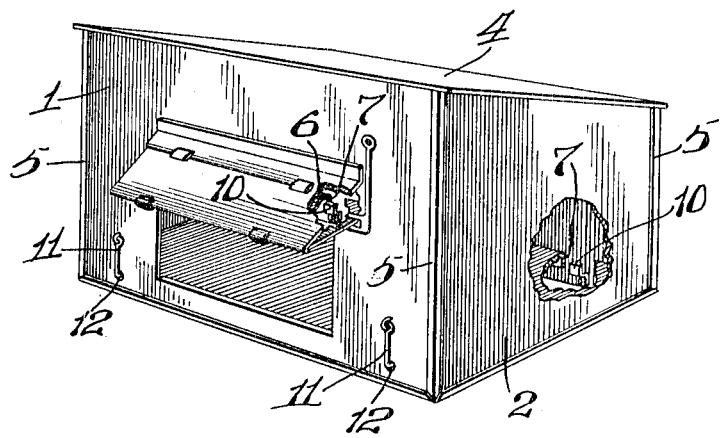
Figure 2:
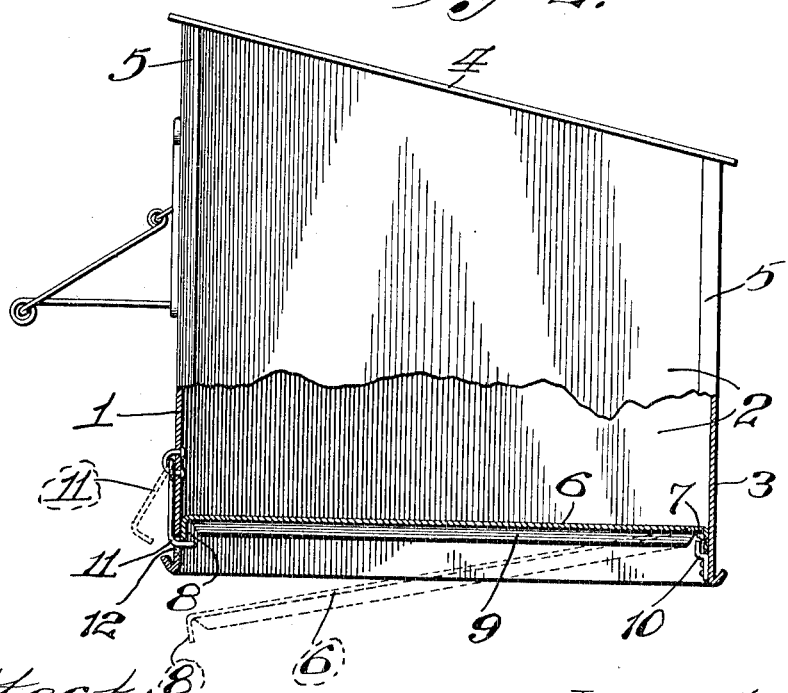

In the drawings: Figure 1 is a perspective view of my improved poultry coop with parts broken away to show the floor supporting brackets on the inside walls of the coop; and, Fig. 2 is a side elevation of the same with a portion of the wall broken away to illustrate the coop bottom, parts being shown in section.

Referring in detail to the drawings, 1 represents the front wall, 2 the end walls, 3 the rear wall and 4 the roof of my coop. These several members are preferably made of sheet metal in order that they will be of light and inexpensive construction, and the walls are connected at the corners by corner pieces 5 bent into angular shape and engaging outturned flanges of the walls (not shown). The roof 4 is preferably secured to the upper edges of the walls by flanged seam joints which serve to connect the parts. 6 designates the floor of the coop, which is also preferably of sheet metal and is provided with a downturned rear flange 7, a downturned front flange 8 and downturned end or side flanges 9. This floor in my coop is located considerably above the bottom edge of the coop walls in order that when poultry are in the coop, they will be above the ground and not subject to dampness emanating therefrom. The floor of the coop 6 is supported at its rear by brackets 10 attached to the rear wall of the coop and extending outwardly therefrom and upwardly to form each a hooklike device spaced from the rear wall 3 to receive the downturned rear flange 7 of the bottom 6. As shown in Fig. 1, there are two of these outwardly and upwardly projecting brackets 10 spaced from and relatively near their side walls 2 of the coop. At the front of the coop, the bottom 6 is supported by a plurality of hooks 11, shown in the drawings as two in number, secured to the front wall 1 of the coop and adapted to project through the front wall 1 and engage the lower edge of the downwardly turned front flange 8 on the bottom 6. The hooks 11 project through perforations 12 in the front wall 1 of the coop and it is obvious that if they are pulled outwardly the front of the coop bottom 6 will drop and by slightly raising or tilting the coop, the same may be readily removed for the purpose of cleansing. Likewise, with this arrangement, the floor 6 may be readily inserted in the coop in the manner illustrated in dotted lines in Fig. 2. The provision of a pair of spaced hook-like floor-supporting brackets 10, and the flanging of the lower edges of the side and end walls of the coop outwardly leaves absolutely no place for the accumulation of dirt or other matter which would clog the connection between the coop bottom and the coop proper. This, in coops heretofore, has been exceedingly objectionable because such connections would rapidly fill with dirt and other matter and become so wedged that it would be impossible or very difficult to remove the coop bottom. With the structure shown in the present application, these objections are overcome, and the instant the hooks 11 are withdrawn, the bottom 6 will drop and then may be readily removed from the coop.

I claim:

1. In a poultry coop, the combination with lateral walls, of brackets secured to the inside of one of the walls, said brackets having an outstanding upturned portion, hooks swingingly mounted upon the outside of another of said walls and having their points projecting through apertures therein, and a drop bottom disposed within and suspended from the walls of said coop by said brackets and said hooks, said bottom being partially supported by said hooks.

2. In a poultry coop, the combination with lateral walls, of brackets secured to the inside of one of said walls, said brackets having an outstanding up-turned portion, hooks swingingly mounted upon the outside of another of said walls and having their points projecting through apertures therein, a drop bottom having a depending edge adjacent one side thereof, said depending edge adapted to be loosely mounted in said brackets, the opposite edge of said bottom adapted to be supported by said hooks, said depending edge of said bottom being loosely mounted in said brackets adapted to allow said bottom to swing downwardly when released by said hooks.

WILLIAM L. NIEMANN.

In the presence of—
A. O. KNIGHT,
J. B. MEGOWN.